FIP8102 XR 3,622,877

United States Patent

[11] 3,622,877

[72] Inventors Kenneth R. MacDavid
Clarence Center;
Donald G. Shuda, Clarence Center; John F. Leaver, Jr., North Tonawanda, all of N.Y.
[21] Appl. No. 874,839
[22] Filed Nov. 7, 1969
[45] Patented Nov. 23, 1971
[73] Assignee Sanders Associates Inc.
South Nashua, N.H.

[54] APPARATUS FOR TESTING MODULATOR DEMODULATOR UNITS FOR TRANSMISSION ERRORS AND INDICATING THE ERRORS PER POWER OF 10
4 Claims, 5 Drawing Figs.

[52] U.S. Cl. 324/73 R, 325/41, 325/67, 340/146.1
[51] Int. Cl. G01r 15/12
[50] Field of Search 340/146.1; 325/41, 67; 178/23.1; 324/73 R

[56] References Cited

UNITED STATES PATENTS

| | | | |
|---|---|---|---|
| 3,036,290 | 5/1962 | Zarouni | 178/23.1 |
| 3,069,498 | 12/1962 | Frank | 340/146.1 |
| 3,496,536 | 2/1970 | Wheeler et al. | 324/67 |

*Primary Examiner*—Michael J. Lynch
*Assistant Examiner*—R. J. Corcoran
*Attorney*—Louis Etlinger ABSTRACT: Test apparatus for testing and recording either accumulated errors or the probability of error for either synchronous or asynchronous digital data modulator/demodulator units (modems). The modem tester includes a test generator which under the control of a bit rate selector and a sequence mode selector generates a bit test sequence. The bit test sequence is modulated by the modulator portion of a modem under test and is then applied to the demodulator portion of either the same or a different modem under test. The modem tester further includes a reference bit sequence generator and a data synchronization network responsive to the bit test sequence after demodulation for synchronizing the reference bit sequence generator with the test sequence received from the demodulator under test. The received test sequence and the referenced sequence are compared with disagreements of the comparison being accumulated in an error counter. For testing asynchronous modems, a bit synchronization network is provided to maintain the sampling window of the comparator at substantially the middle of a bit period. In order to display probability of error, the mode sequence selector is settable to any one of plural total bits indicia expressed as powers of 10 on the display panel. A total bit counter responds to such settings to inhibit further operation of the error counter after a number of bit periods equal to the setting of the selector such that the total errors per power of 10 bits is displayed directly on the display panel.

INVENTOR
KENNETH R. MAC DAVID
DONALD G. SHUDA
JOHN F. LEAVER JR.
BY Robert R. Hubbard
ATTORNEY

*INVENTORS*
KENNETH R. MAC DAVID
DONALD G. SHUDA
JOHN F. LEAVER JR.

BY Robert R. Hubbard
*ATTORNEY*

INVENTORS
KENNETH R. MAC DAVID
DONALD G. SHUDA
JOHN F. LEAVER JR.
BY Robert R. Hubbard
ATTORNEY

APPARATUS FOR TESTING MODULATOR DEMODULATOR UNITS FOR TRANSMISSION ERRORS AND INDICATING THE ERRORS PER POWER OF 10

BACKGROUND OF THE INVENTION this invention relates to novel and improved test apparatus and in particular to apparatus for detecting errors in defective date communication units and those caused by poor communication channels and for displaying accumulated errors.

Data communication units are generally useful in transmitting and receiving of digital data signals via communication channels, e.g., voice grade channels such as telephone lines. Such data units usually include a modulator (transmitting) and a demodulator (receiving) and are frequently called modems.

In the testing of The for errors, the usual test procedure is to pass a selected test bit sequence through a transmission path including a modulator and a demodulator connected to one another via a communication channel and then to compare the test bit sequence upon its return from the path with a reference bit sequence identical to the selected bit sequence. The disagreements of the comparison are accumulated as errors and displayed on a display panel. One of the difficulties with this type of tester has been that the operator who wanted the probability of error (number of errors per total number of bits tested) had to (1) time the test run and (2) perform a tedious calculation of dividing the number of errors by the product of the bit rate and the time of the test.

BRIEF SUMMARY OF THE INVENTION

It is an object of the present invention to provide novel and improved test apparatus for detecting errors in a transmission path which includes a data modulator and a data demodulator.

Another project is to provide a novel and improved modern tester with a display panel which directly displays the probability of error.

Still another object is to provide a novel and improved modern tester which is capable of detecting errors in synchronous modems as well as in asynchronous modems.

In brief, the tester of the present invention is embodied in apparatus for testing a transmission path which includes a modulator unit and a demodulator unit by applying a bit test sequence to the path and upon its return comparing it to a reference bit sequence which is identical to the test bit sequence originally applied to the transmission path. The comparison is performed by a comparator means on a sample basis. An error accumulator accumulates errors of disagreement between the referenced and returned bit sequences and the accumulated error is displayed on a display panel. A selector mounted on the display panel is settable to any one of plural total bits indicia expressed as powers of 10 on the panel adjacent to the selector. Means responsive to the selector being placed in a total bits setting inhibits further operation of the error accumulator after a number of bit periods equal to the setting of the selector whereby the total errors per power of 10 bits is displayed directly on the panel.

Also embodied in the test apparatus is a synchronization circuit for synchronizing a reference bit sequence generating means with the returned bit sequence. When an asynchronous type modem is being tested, a bit synchronization circuit is operative to maintain the window of the comparison sample substantially in the middle of a bit period.

BRIEF DESCRIPTION OF THE DRAWINGS

In the accompanying drawings, like reference characters denote like structural elements, and.

DESCRIPTION OF PREFERRED EMBODIMENT

Figure 1A:
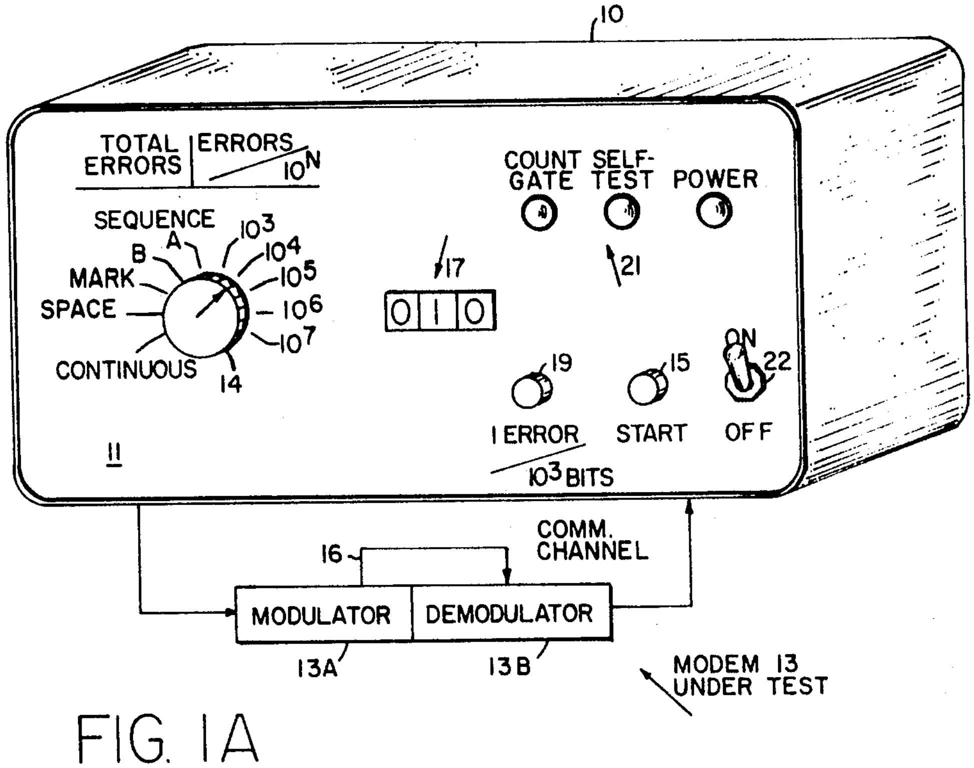
FIG. 1A is a perspective view, in part, and a block diagram, in part, of the display panel of test apparatus which embodies the invention and which is connected in an exemplary testing circuit.
Figure 1B:
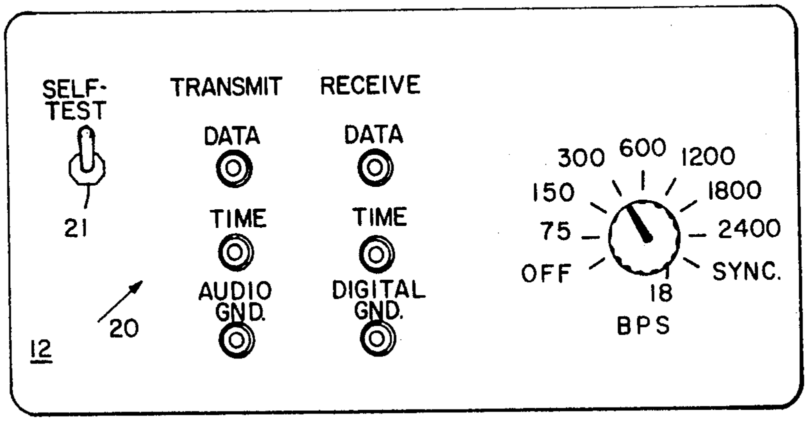
FIG. 1B is a plan view of the rear panel of the tester shown in FIG. 1A and FIGS. 2–2B are a block diagram, in part, and a logical network schematic, in part, of test apparatus embodying the invention.

Referring now to FIGS. 1A and 1B test apparatus 10 embodying the invention is shown to have a front display panel 11 (FIG. 1A) and a rear panel 12 (FIG. 1B). In FIG. 1A the tester 10 is shown in an exemplary test circuit having a transmission path which includes a modem 13 having a modulator **13*a* and a demodulator 13*b***.

By means of a selector 14 mounted on from panel 11 a test bit pattern is selected for application to modulator **13*a* when a start switch 15 is depressed. The test bit pattern is modulated by modulator 13*a* and applied via a communication channel 16 to demodulator 13*b*. Demodulator 13*b* demodulates the test bit sequence and returns it to the tester 10. The tester 10 compares the returned bit sequence with a referenced bit sequence and displays the accumulated errors of disagreement by means of display elements 17 on front panel 11**.

The selector 14, which for example may be a stepping switch, is settable to any of a first group of positions to select different test bit patterns. The indicia on front panel 11 for the different bit patterns are labeled as Sequence A, Sequence B, Mark, Space and Continuous. The Mark and Space sequences are, of course all marks and spaces, respectively. The other three bit patterns may include any suitable combination of bits. For example, the continuous test bit pattern may be a pseudo-random 2,047-bit sequence.

The selector 14 is further settable to a second group of positions indicative of different numbers of total bits transmitted in a test run. This group of settings for selector 14 is employed when the probability of error is desired. To this end, the group of further settings are labeled by indicia expressed as the following powers of 10: $10^3$, $10^4$, $10^5$, $10^6$ and $10^7$. When the selector 14 is in any of the total number of bits positions, the probability of error is directly readable from the display elements 17 with the decimal point being placed according to the selected power of 10. Thus, for the illustrated $10^4$ bits position of selector 14 the probability of error is 0.001. That is, the decimal point is placed a number of digits equal to the selected power of 10 to the left of the right-most digit displayed by display element 17. The display elements 17 may be, for example, decimal readout devices.

Also on front panel 11 there is mounted a switch 19 for the purpose of injecting one error per 1,000 bits to assure proper operation in error-free circuits. Thus, for an error-free transmission path in FIG. 1A the display element 17 will display an accumulated error of 10 in response to depression of the switch 19 for the illustrated $10^4$ bits position of the selector 14.

A bit rate selector 18 mounted on the rear panel 12 (FIG. 1B) is employed to select the bit rate in bits per second (BPS) of the test bit pattern. To this end selector 18, which may for example be a stepping switch, is shown to be settable to a plurality of different bit rates for the case where an asynchronous modem is being tested and further settable to a SYNC position for the case where a synchronous modem is being tested.

Also located on the rear panel 12 are a number of transmit and receive jacks, designated collectively at 20 and labeled according to their respective functions. Thus, the transmit and receive Data jacks transmit the test bit pattern and receive the return pattern, respectively. The transmit and receive time jacks are for the purpose of receiving the timing (clock signal) of a synchronous modulator and a synchronous demodulator, respectively, connected in the transmission path under test. The remaining two jacks are for the purpose of assuring appropriate ground connection between the tester 10 and the units under test.

The tester 10 also includes a self-test feature as illustrated by the self-test switch 21 located on the rear panel 12 (FIG. 1B). When the self-test switch is activated, the test bit pattern is routed internally within the tester 10 to the comparison circuits included therein as described hereinafter.

A group of indicator lamps located on the front panel 11 (FIG. 1A) are employed for the following purposes: the Count Gate lamp is lit during probability of error test runs; the self-test lamp is lit during self-test operation; and the power lamp is lit whenever the tester 10 is turned on, as for example, by means of on/off switch 22. Power may be supplied to tester 10 by any suitable means not shown in FIGS. 1A and 1B.

It will be appreciated that the full duplex loop test circuit shown in FIG. 1 is by way of example only and that other test circuits may be employed. For example, the following tests may also be made; (1) full duplex back-to-back testing of two modems, (2) half duplex or full duplex line testing requiring two testers with one tester being in a transmit mode and the other in a received mode, and (3) simplex line testing of two modems (one modulating and one demodulating) with two testers one of which is transmitting and the other of which is receiving.

Figure 2A:
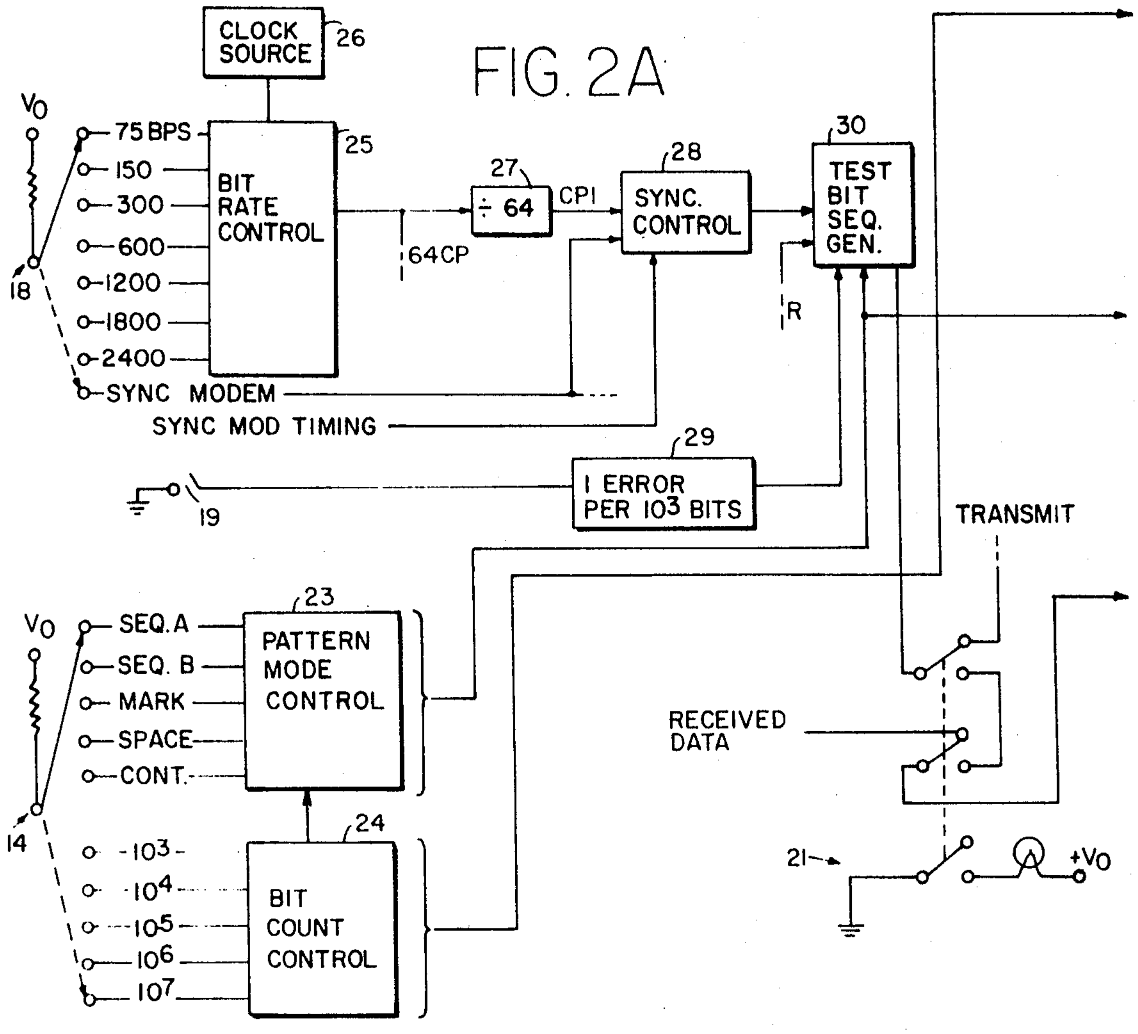
Figure 2:
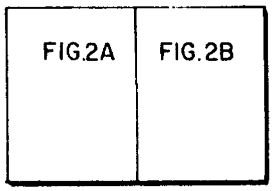
Figure 2B:
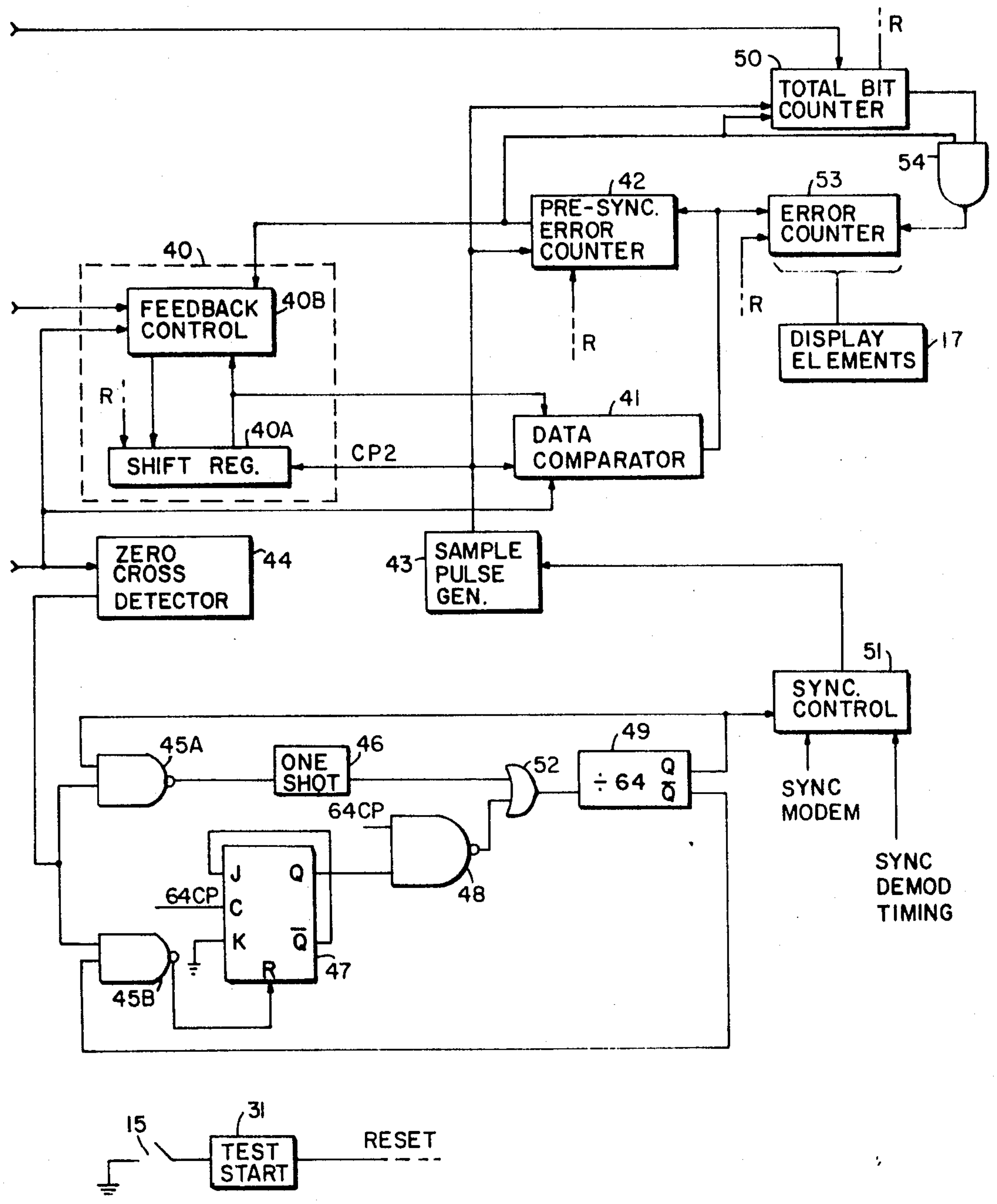

The test apparatus 10 will now be described in more detail with reference to the schematic diagram of FIGS. 2A and 2B which are arranged according to the composite shown in FIG. 2. As shown in FIGS. 2A and 2B, the settings of selectors 14 and 18 control the bit patterns and the bit rates, respectively, generated by a test bit sequence generator 30 and a reference sequence generator 40. To this end, the bit pattern positions of selector 14 are decoded by a pattern mode control 23 to provide a group of mode control signals to both sequence generators 30 and 40. In addition, the total number of bits positions of the selector 14 are decoded by a bit/count control 24 to provide a group of bit/count control signals to a total bit counter 50 as well as to supply a control signal to the pattern mode control 23. The pattern mode control 23 responds to the latter control signal to provide the continuous bit pattern mode control signals to the generators 30 and 40 for all of the total bits settings of selector 14. On the other hand, the bit rate positions of the selector 18 are employed in a bit rate control 25 to provide corresponding divisions of the clock frequency of a stable clock source 26.

For the case where an asynchronous modem is to be tested, the bit rate control provides an output of clock frequency which is 64 times the selected bit rate, designated in FIGS. 2A and 2B as 64 CP. The 64 CP output of the bit rate control 25 is applied to a divide by 64 network 27 and is further routed to other portions of the tester as indicated by the dashed connections. The divide by 64 network 27, which may be a digital counter, divides the frequency of the 64 CP signal to provide a clock signal CP1 having a frequency equal to the selected bit rate to a synchronous control 28.

For the case where a synchronous modem is being tested, the selector 18 is in contact with the synchronous modem position so as to bypass the bit rate control 25 and the divide by 64 network 27 to directly apply a control level to the synchronous control 28. It is convenient to note at this point that the selector as well as the selector 14 is operative to apply a voltage level, such as the illustrated plus $V_0$ volts to its selected contacts. Still, for the case of testing a synchronous modem, the synchronous modulator timing or clock signal is also applied to the synchronous control 28. The synchronous control 28 includes suitable switching circuitry which is responsive to the presence and absence of the synchronous modem level control signal to connect either the synchronous modulator clock or the selected bit rate clock, respectively, to the bit test sequence generator 30.

The bit test sequence generator 30 includes any suitable sequence generating circuits and may, for example, include a shift register with suitable feedback networks which are programmable by the mode control signals so as to produce a selected bit pattern. The bit test sequence generator 30 also received a further input which is occasioned by the depression of the switch 19 so as to intentionally cause the injection of one error every 1,000 bits. To this end, a one error per $10^3$ bits network 29 responds to the closing of switch 19 to provide an appropriate control signal to the programmable feedback networks contained within the test sequence generator 30. The bit test sequence generator 30 also receives a reset signal R which is supplied by a test start network 31 in response to the momentary depression of the start switch 15. The test start network 31 may suitably be a one shot multivibrator type network. The purposes of the reset signal R are to reset the sequence generator 30 at the start of each test run, as well as to reset other networks referred to hereinafter.

The output test bit sequence of generator 30 is routed by the self-test switch 21 to either the transmission path under test via the transmit contact of the self-test switch (position shown in FIG. 2B) or to the reference sequence generator 40 and data comparator 41 for a self-testing operation. For the position shown in FIG. 2B, the self-test switch 21 routes the test bit sequence to the transmission path under test and further routes the received data or returned test bit sequence to the reference generator 40 and the data comparator 41.

The reference bit sequence generator 40 is similar to the test bit sequence generator 30 and is shown to include a shift register **40*a* and a programmable feedback control 40*b* which causes the shift register 40*a* to have a number of different operating modes in response to a number of different control type signals. Thus, feedback control 40*b* receives bit pattern mode control signals from the pattern mode control 23 so as to program shift register 40*a*** into the appropriate number of stages for a selected bit pattern.

The feedback control **40*b* also responds to a data synchronization network which serves the purpose of synchronizing the reference generator 40 with the received or returned test bit sequence. To this end, the feedback control 40*b* is connected to receive the returned data and at the start of the test to connect such data for serial loading into the shift register 40*a*. The shift register 40*a* is clocked at the bit rate so as to present its output in serial fashion to data comparator 41. Data comparator 41 compares the output of shift register 40*a* with the incoming data (returned test bit sequence) on a bit-by-bit basis. To this end, comparator 41** may suitably include an identity type circuit.

The disagreement between the output of shift register **40*a* and the incoming data result in error signals which are applied to reset a presync counter 42 which is advanced (incremented) at the bit rate. Thus, so long as the output of shift register 40*a* and the incoming data are out of synchronization (do not agree), counter 42 cannot be advanced. When they do agree, the counter 42 is advanced. When counter 42 has advanced a predetermined number of count values (i.e., a like predetermined number of agreements in comparator 41), counter 42 provides a data sync level control signal to feedback control 40*b*. The feedback control 40*b* responds to the data sync control signal to disconnect the incoming data from the shift register 40*a* and to lock up the shift register 40*a* such that the latter now generates the reference bit sequence in accordance with the pattern mode control signals and in synchronization with the incoming data. The reset signal R is also applied to both the shift register 40*a* and the presync error counter 42** so as to reset both to initial conditions at the start of the test run.

In the above description it was mentioned that both shift register **40*a* and presync counter 42 are clocked at the bit rate. The bit rate clock signal CP2 for this purpose is derived from a sample pulse generator 43 which also provides the same clock signal CP2 to data comparator 41 as a sample pulse. The width of the sample pulse establishes the sample window for data comparator 41**, which window is preferably near the middle of a bit period.

In order to assure that the sample window is maintained at substantially the middle of a bit period for the testing of asynchronous modems, a bit synchronization network responds to the incoming data to control the position of the bit sample window. This is done by measuring the time intervals between successive zero-crossings of the received data and comparing such time intervals with a local standard or reference time interval period. Depending upon whether a current zero crossing is early or late, the triggering of the sample pulse generator 43 is retarded or advanced, respectively.

The zero-crossings of the incoming data are detected by a zero-crossing detector 44 which provides a positive-going output pulse for each zero-crossing. The local standard or reference interval is derived from the internal clock 64 CP. To this end, a divide by 64 counter 49, which for example may have six stages, counts the 64 CP signal which is applied thereto via a normally enabled NAND gate 48. The Q and $\overline{Q}$ outputs of the last stage of counter 49 then have a positive and a negative going transition once during each bit period (since the frequency of the 64 CP signal is 64 times the bit rate). These transitions are compared with the positive-going zero-crossing detector output pulses by means of NAND gates 45*a* and 45*b*. Thus, NAND gate 45*a* receives as one input the Q output of counter 49 and NAND gate 49*b* receives as one input the $\overline{Q}$ output of counter 49. Both NAND gates 45*a* and 45*b* receive as another input the positive going zero-crossing pulses.

Ideally, the zero-crossing pulses should bridge or overlap the positive-going transition of the Q output of counter 49. However, when a test run is started or when the received signal is distorted by jitter, this is not usually the case such that the zero-crossing pulses may occur earlier or later than the positive going transition of the Q output of counter 49.

Consider now the case where the zero-crossing occurs later than the positive-going transition of the Q output of counter 49. For this case NAND gate 45*a* responds to a positive-going zero-crossing pulse (the Q signal is high by assumption) to provide a low-going pulse which triggers a one shot multivibrator network 46. The one shot 46 has a period which is short compared to the period of the 64 CP signal so as to provide a negative-going output pulse of short duration which is inserted or added to the train of input pulses to counter 49 by means of an OR gate 52. This added input pulse to counter 49 has the effect of advancing the occurrence of the Q and $\overline{Q}$ output transitions by one sixty-fourth of a bit period. So long as succeeding zero-crossing pulses occur later than the positive-going transition of the Q output of counter 49, NAND gate 45*a* and one shot 46 respond to such succeeding zero-crossing pulses to add or insert pulses into the train of input pulses to counter 49 so as to advance the occurrence of the Q and $\overline{Q}$ transition by one sixty-fourth of a bit period during each bit period in which a zero-crossing is detected.

Consider now the case where the zero-crossing pulse occurs earlier than the positive-going transition of the Q output of counter 49. For this condition, NAND gate 45*b* responds to a positive-going zero-crossing pulse to provide a negative-going pulse to the reset terminal of a JK flip-flop 47 which is clocked by the 64 CP signal. The JK flip-flop 47 has its K input connected to a source of low-level digital signal, such as the illustrated connection to circuit ground. The JK flip-flop 47 also has its Q output connected to its J input and its $\overline{Q}$ output connected as an input to NAND gate 48. The negative-going reset signal drives the Q output of flip-flop 47 low so as to inhibit NAND gate 48 from responding to the next succeeding positive-going pulse of the 64 CP signal. Flip-flop 47, however, does respond to the next succeeding negative going transition of the 64 CP signal to return its Q output to a high-level (due to the connection between its J and $\overline{Q}$ terminals) such that NAND gate 48 is reenabled to continue passing the 64 CP signal via OR gate 52 to the input of counter 49. The effect of the subtracted or inhibited input pulse to counter 49 is essentially to retard or delay the occurrence of the Q and $\overline{Q}$ output transitions of counter 49 by 1/64 of a bit period. So long as succeeding zero-crossing pulses occur earlier than the positive-going transition of the Q output of counter 49, NAND gate 45*b* and flip-flop 47 respond to such zero-crossings to retard or delay the occurrence of the Q and $\overline{Q}$ output transitions by one sixty-fourth of a bit period during each bit period in which a zero-crossing is detected.

For the case where the zero-crossing pulse overlaps the Q and $\overline{Q}$ output transitions (of counter 49), both of the "too early" (gate 45*b* and flip-flop 47) and the "too late" (gate 45*a* and one shot 46) networks would try to operate. However, this is not believed to be a problem since (1) if the faster of the two networks wins the race, the other network would respond to the next zero-crossing to correct the point at which the Q and $\overline{Q}$ transitions occur, (2) the period of one shot 46 is short, and (3) flip-flop 47 is clocked back to its enabling state by the next negative-going transition of the 64 CP signal.

The Q output of counter 49 is routed via a sync control unit 51 to trigger the sample pulse generator 43. Thus, the sample pulse generator 43 may include a suitable one shot multivibrator and associated logic circuitry, if necessary, to respond to the positive-going transitions of the Q output of counter 49 to provide an output sample pulse of duration which is short compared to the bit period and which occurs substantially in the middle of the bit period.

The synchronous control 51 is somewhat similar to the aforementioned synchronous control 28 in that both respond to the absence of the synchronous modem control signal to enable the internal clock of the test apparatus to be employed. For the case where a synchronous modem is being tested, the synchronous control 51 responds to the presence of the synchronous modem control signal to connect the timing or clock signal of the synchronous demodulator being tested to the sample pulse generator 43.

When the aforedescribed bit and/or data synchronization networks have operated to synchronize the referenced generator 40 with the incoming or received data, the synchronous level control signal (output of the presync error counter 42) enables the error counter 53 to count or accumulate as errors the disagreement of data comparator 41. To this end, the synchronous level control signal is applied by way of a normally enabled AND gate 54 to error counter 53. The outputs of error counter 53 are decoded by means not shown and employed to provide the driving energy for the display elements 17.

The normally enabled AND gate 54 is enabled by an output from the total bit counter 50 which is always reset at the start of a test run so as to provide a high-level enabling signal to AND gate 54. The total bit counter 50 also receives the synchronous level control signal but responds thereto only when selector 14 is placed in the total bits setting. Thus, when selector 14 is placed in any one of the total bits settings, the total bit counter 50 is wholly enabled to count the CP2 output signal of the sample pulse generator 43 and hence the number of bit periods. When the total bit counter 50 has accumulated a count which corresponds to the setting of the selector 14, it provides a low-going inhibit signal to AND gate 54 so as to inhibit further accumulation of errors by the error counter 53 to thereby provide a direct reading from display elements 17 and the setting of selector 14 of the probability of error.

In summary, there has been described novel and improved test apparatus embodying the invention for performing error tests on transmission paths which include a modulator and a demodulator of either the synchronous or of the asynchronous type. In addition, the test apparatus includes novel means for presenting a direct display of the probability of error. It will be appreciated that the illustrated values for the bit rates setting and for the total bits setting are by way of example only and that other values may be employed so long as, for the case of the total bit settings, the values are expressed as powers of 10. It will be further appreciated that the employment of a clocking signal which is 64 times the selected bit rate for the case of testing asynchronous modems is by way of example only and that other suitable multiples of the bit rate may be employed. In addition, the relative placing and appearance of the selectors 14 and 18 and other switches and indicator lamps on the display panels is by way of example only and that other arrangements are possible.

What is claimed is;

1. A tester for testing a transmission path including a modulator unit and a demodulator unit by applying a bit test sequence to the path and receiving therefrom said test sequence after modulation and demodulation by said units, comprising;

a source of clock signals, first means responsive to said clock signals for generating said bit test sequence for application to said transmission path under test;

second means responsive to said clock signals for generating a reference bit sequence identical to said test bit sequence;

comparator means enabled during each bit period by a sampling pulse to compare a sample of said reference sequence and of said received sequence, synchronization means including 1. Means for synchronizing said reference sequence generating means with said received bit sequence; and 2. Means responsive to said received bit sequence and to said clock signals for producing said sampling pulse substantially in the middle of a bit period;

means responsive to said comparator means for accumulating errors of disagreement between the samples of the reference and received bit sequences; and a display panel including means responsive to said error accumulating means for displaying accumulated errors.

2. The invention according to claim 1 wherein a selector mounted on said display panel is settable to any one of a plurality of bit sequences according to indicia adjacent thereto on said display panel; and wherein each of said first and second means includes programmable means responsive to said selector for generating a selected one of said plurality of bit sequences.

3. The invention according to claim 2 wherein said selector is further settable to any one of plural total bits indicia expressed as powers of 10 on said panel; and wherein means responsive to said selector being placed in a total bits setting inhibits further operation of said error accumulator after a number of bit periods equal to the setting of said selector whereby the total errors per power of 10 bits is displayed directly on said panel.

4. Test apparatus for testing a transmission path including a modulator unit and a demodulator unit by applying a test bit sequence to the path and receiving therefrom said test sequence after modulation and demodulation by said units, comprising first means for generating said test bit sequence for application to said transmission path under test;

second means for generating a reference bit sequence identical to said test bit sequence;

comparator means for comparing samples of said reference sequence and of said received sequence during each bit period;

synchronization means for synchronizing said reference sequence generating means with said received bit sequence;

means responsive to said comparator means for accumulating errors of disagreement between the reference and received bit sequences;

a display panel having first means mounted thereon responsive to said error accumulating means for displaying accumulated errors and having further mounted thereon a selector which is settable to any one of a plurality of total bits indicia expressed as powers of 10 on said panel; and means responsive to said selector being placed in total bits setting for inhibiting further operation of said error accumulator after a number of bit periods equal to the setting of said selector whereby the total errors per power of 10 bits is displayed directly on said panel.

* * * * *